United States Patent [19]

Middlebrook et al.

[11] Patent Number: 4,638,295

[45] Date of Patent: Jan. 20, 1987

[54] VEHICULAR MOVEMENT INDICATOR SAFETY SYSTEM

[76] Inventors: Robert B. Middlebrook, 47 Hemlock Cir., Princeton, N.J. 08540; W. Bard Turner, 7 Bryant Rd., Lexington, Mass. 02173

[21] Appl. No.: 607,954

[22] Filed: May 7, 1984

[51] Int. Cl.⁴ ............................................. B60Q 1/34
[52] U.S. Cl. ...................................... 340/73; 340/84; 307/10 LS; 364/424
[58] Field of Search ....................... 340/66, 67, 70, 71, 340/73, 84; 364/424; 307/10 LS

[56] References Cited

U.S. PATENT DOCUMENTS

| | | | |
|---|---|---|---|
| 2,308,097 | 1/1943 | Murray, Jr. | 340/56 |
| 3,196,311 | 7/1965 | Bleiweiss et al. | 315/77 |
| 3,503,042 | 3/1970 | Skinner | 340/67 |
| 3,761,875 | 9/1973 | Camp | 340/70 X |
| 3,784,974 | 1/1974 | Hamashige | 340/67 |
| 4,348,655 | 9/1982 | Goertler et al. | 340/66 X |

FOREIGN PATENT DOCUMENTS

| | | |
|---|---|---|
| 843893 | 8/1960 | United Kingdom . |
| 967959 | 8/1964 | United Kingdom . |

*Primary Examiner*—James L. Rowland
*Assistant Examiner*—Jeffery A. Hofsass

*Attorney, Agent, or Firm*—Richard C. Woodbridge

[57] ABSTRACT

A vehicular movement indicator safety system consisting of motion and status sensors on the dynamic moving systems of a vehicle, a programmed microprocessor control unit, and conventional signal indicators. The microprocessor is programmed to integrate data from sensors related to wheel, steering, brake, engine and transmission systems to determine the exact nature of changes in vehicular movement resulting from operation of one or more of the dynamic systems, to distinguish between a driver's signaled intent to turn or make a change in vehicular movement and the actual onset of the turn or change as determined by concurrent activation of dynamic systems, and to immediately activate signal indicators to produce clear, unambiguous and readily perceived signals corresponding to the changes in vehicular movement.

The vehicular movement indicator safety system generates instantaneous signals alerting drivers to a change, eliminates the uncertainty, ambiguity and confusion prevalent with existing turn signal and brake indicator systems, and significantly enhances ability of drivers to quickly perceive and react to changes in movement of other vehicles in substantially all traffic situations and under adverse as well as normal visibility and weather conditions.

2 Claims, 8 Drawing Figures

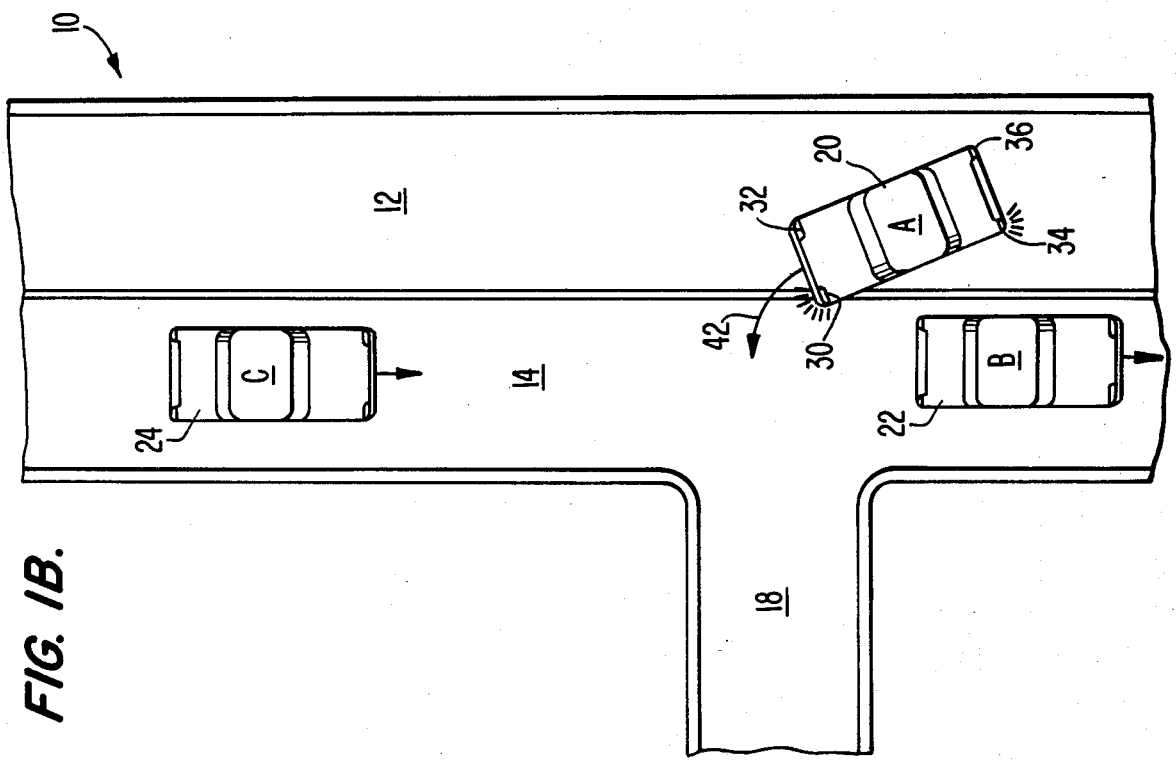
FIG. IB.
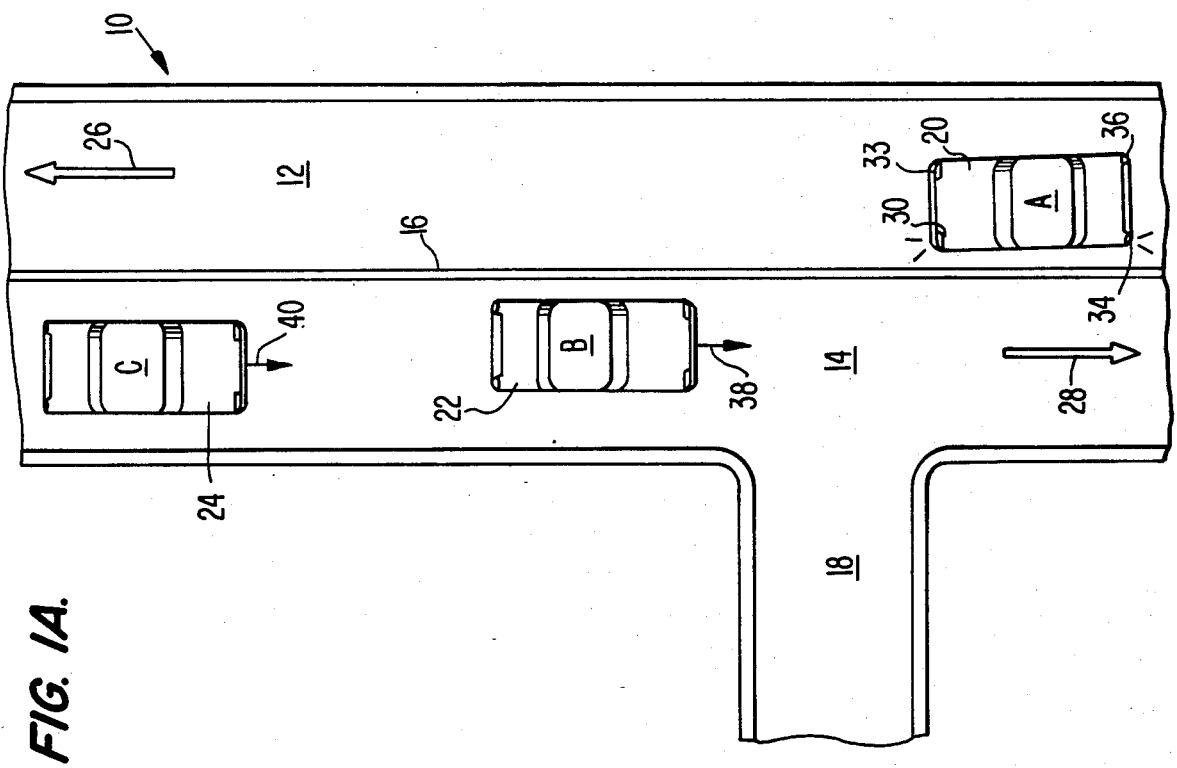
FIG. IA.

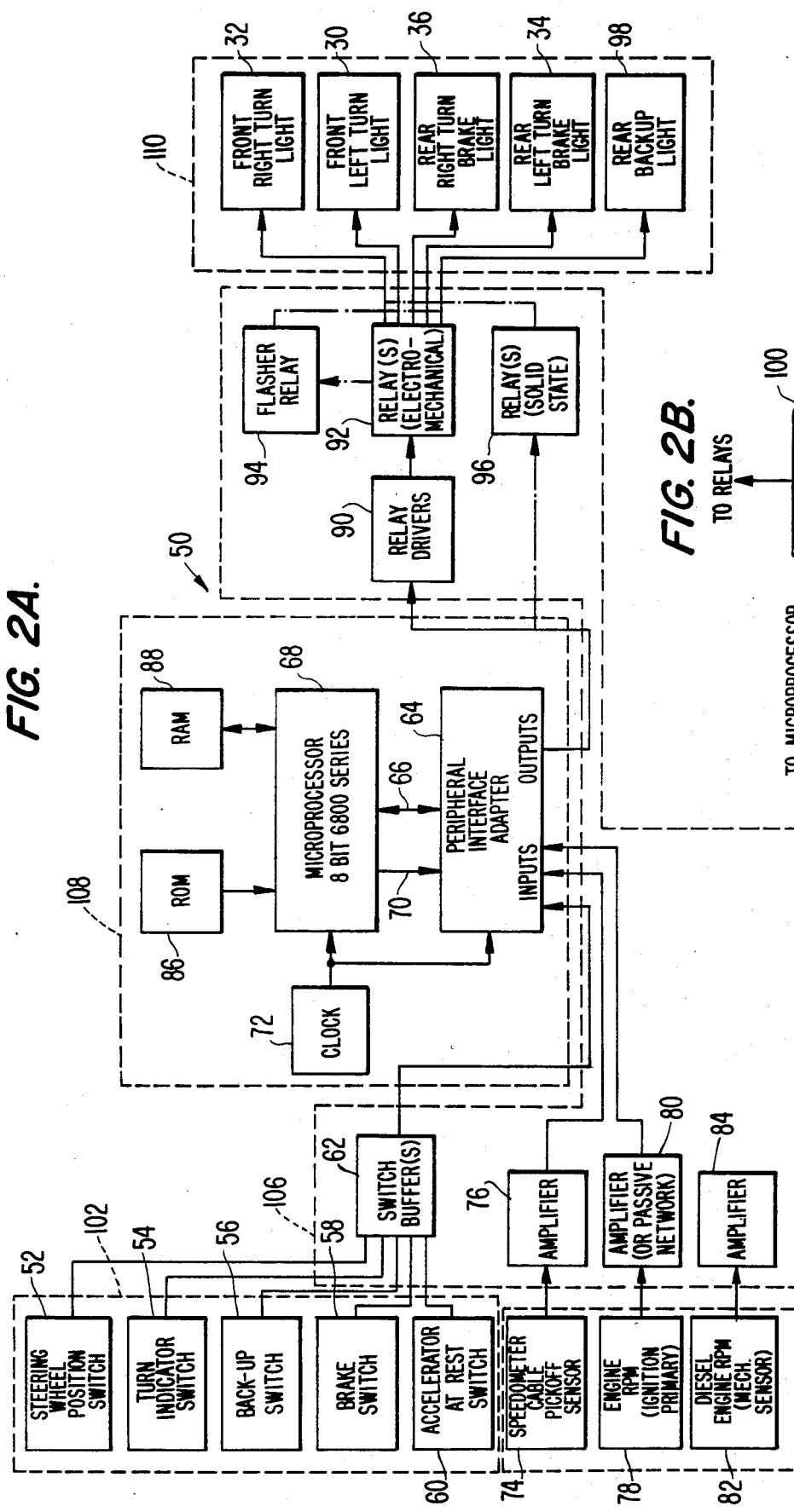

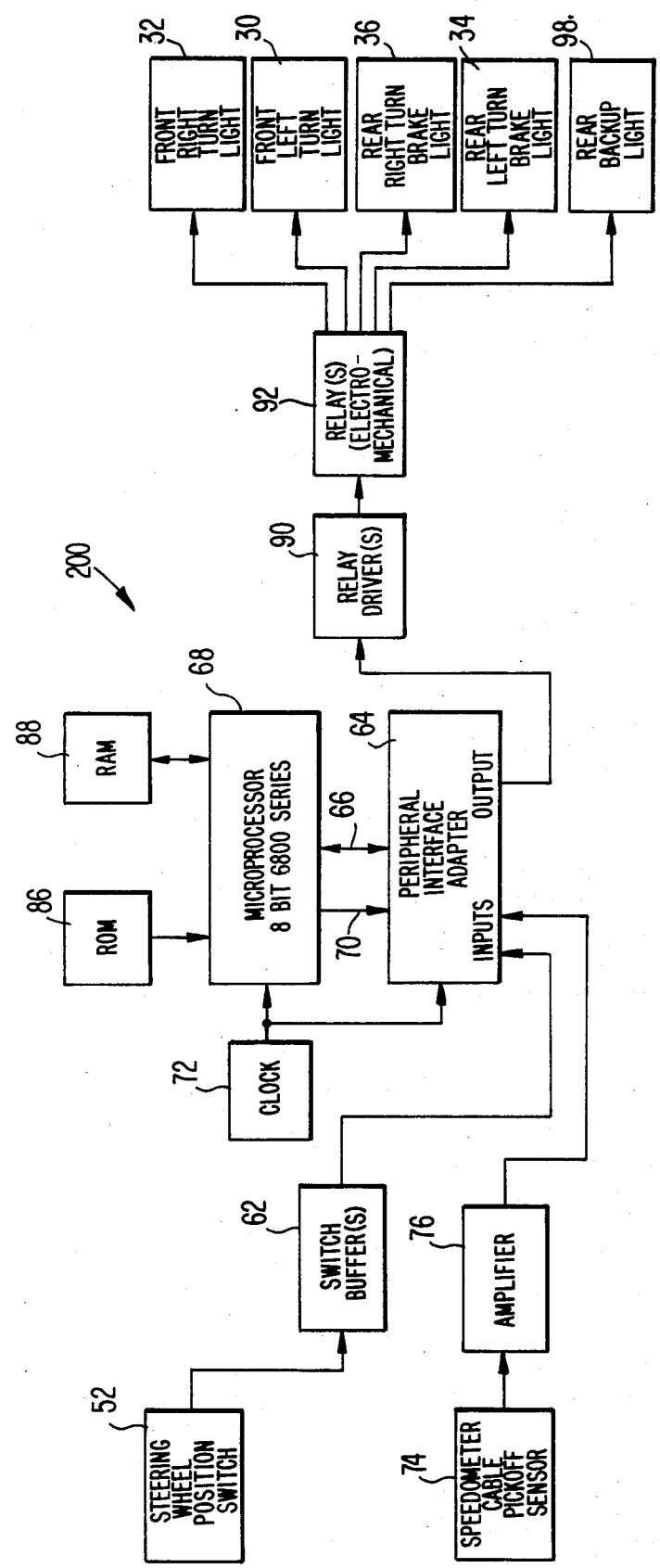

VEHICULAR MOVEMENT INDICATOR SAFETY SYSTEM

BACKGROUND OF THE INVENTION

1. Field of the Invention

The invention relates to a vehicular movement indicator safety system which distinguishes between a driver's intention to turn as indicated by existing turn signal equipment and the actual equipment to an initiation of the turn and signals the actual movement information to other vehicles by automatically activating rapidly increased flashing of the turn signal lamps coincident with the vehicular movement.

2. Description of the Prior Art

There are a number of prior art devices known to those of ordinary skill in the art for signalling the intention of a motor vehicle driver. However, most are not fully automatic and very few address the problem of distinguishing between a driver's intention and the actual committment of the motor vehicle to a movement such as a turn. Of particular interest is British Pat. No. 843,893 which alludes to the problem of a turning car keeping oncoming cars in suspense. In particular it includes the following relevant passage:

"The drivers of vehicles approaching in the opposite direction on the left-hand side of the street, particularly if they move at intervals, cannot determine whether the halted motor vehicle wants to change its direction before them or desires to permit them to pass before it. This uncertainty has in many cases the effect of slowing down the traffic on the left-hand side of the street because it is desired to avoid accidents."

British Pat. No. 843,893 describes in a system in which the left front turn signal has two different modes or conditions of operation. In the first mode the vehicle is positioned to turn, but has not started to turn. Under those conditions the left front signal does not flash, but the rear signal does. In the second mode, the oncoming traffic has cleared and the front turn signal is allowed to flash at the usual rate along with the rear signal. The system is not automatic. Apparently the driver exercises direct control over the flasher operation including the temporary deactivation of the front flasher.

British Pat. No. 967,959 is also of possible relevance in that it discloses a signal system in which the turn signal lamps are adapted to flash at either of two rates to differentiate the intents of a driver to turn or to pull out and to pass. That patent includes the following descriptive passage:

"According to this invention a system of flashing traffic indicators for road vehicles is provided capable of giving two different repeating flashing signals on each side of the vehicle and a control switch or switches are provided to select the desired signal and side of the vehicle on which it appears for the purpose of distinguishing between the intention to turn and that to pull over for the purpose of passing another vehicle or obstruction."

While British Pat. Nos. 843,893 and 967,957 generally address the concept of telegraphing the intentions of a driver to oncoming traffic, they nevertheless do not provide a means for automatically and reliably distinguishing between the intention of the driver and the actual committment of the vehicle to a turn.

U.S. Pat. No. 2,308,097 is of general interest in that it discloses a timer controlled system for terminating turn signal operation. If a vehicle stops during timer operation then the timer is de-activated until the vehicle resumes moving.

Finally, U.S. Pat. No. 3,196,311 is of general interest in that it discusses acceptable ranges of flashing rates.

While some prior art references discuss the general desirability of telegraphing the intentions of a driver to oncoming traffic, insofar as understood, none of those references describe an automatic system that reliably distinguishes between the intention of the driver to turn and the actual committment of the driver to the turn.

SUMMARY OF THE INVENTION

Briefly described the invention comprises a vehicular movement indicator safety system which distinguishes between the signal indicating a driver's intention to initiate a vehicular movement or turn and a sign positively indicating the actual committment of the motor vehicle to the movement and automatically telegraphs that information to oncoming traffic. According to the preferred embodiment of the invention, a front wheel turn sensor and a motor vehicle motion sensor feed information to a microprocessor which in turn controls the flash rate of the vehicle's signal lamps. If the vehicle is stopped and the turn signal switch is activated then the flashing lamps will flash at the rate of eighty flashes per minute. This mode would typically continue until oncoming traffic is cleared. At that point the vehicle would start to turn across the lane of oncoming traffic. Coincident with initiation of vehicular movement the front wheel turn sensor and the motor vehicle movement sensor signal information to the microprocessor which in turn causes the signal lamps to flash at the rate of 200 flashes per minute. The increased flashing rate warns oncoming traffic that the turing vehicle has in fact committed itself to the turn and that a turning movement is in process. The ambiguity of the situation is reduced by virture of the fact that the oncoming driver is appraised of the fact that the turning vehicle has committed to a turn.

According to an alternative embodiment of the invention the motor vehicle movement sensor is replaced by an engine acceleration rate sensor. The automobile engine accelerator rate sensor senses the "jerk" of the engine (i.e. the "speed up" of acceleration) in response to the driver giving the engine more gas to cause the motor vehicle to proceed into the turn. The results are the same as in the preferred embodiment. In other words, the committment to the turn can be detected either by the movement of the automobile or by the acceleration of the engine. These and other features of the invention will be more fully appreciated by referring to the following drawings.

BRIEF DESCRIPTION OF THE DRAWINGS

FIG. 1A illustrates an intersection in which a motor vehicle is prevented from turning by oncoming traffic.

FIG. 1B illustrates an intersection in which the oncoming traffic has cleared and the turning motor vehicle has committed to its turn.

FIG. 2A is a schematic diagram of the maximum configuration of the system.

FIG. 2B illustrates the power supply for the systems illustrated in FIGS. 2A, 3, 4, 5 and 6.

FIG. 3 is a schematic diagram of the preferred embodiment of the invention employing the minimum number of components.

DETAILED DESCRIPTION OF THE PREFERRED EMBODIMENT

Figure 4:
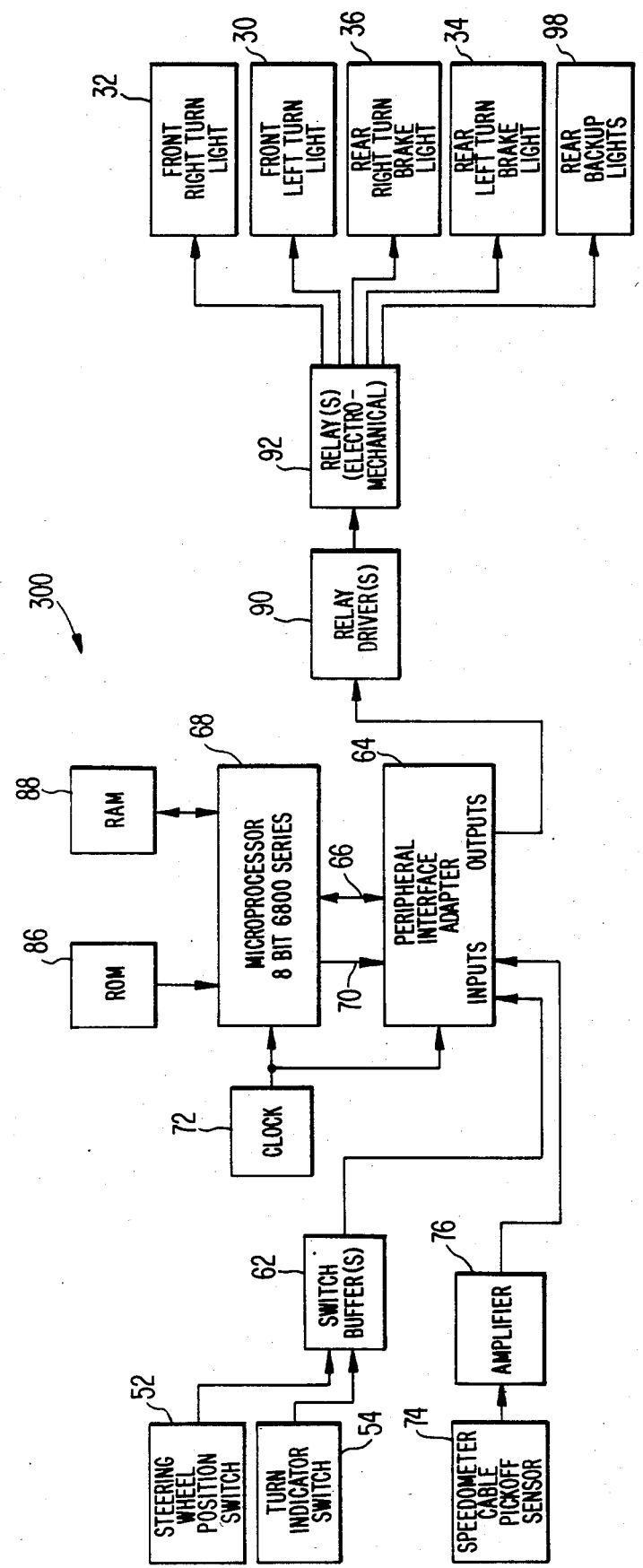
FIG. 4 is an alternative embodiment of the invention illustrated in FIG. 2A in which information from the turn indicator switch is used as an additional input to the microprocessor.

During the course of this description like numbers will be used to describe like elements according to the different figures that illustrate the invention.

The purpose of the Vehicular Movement Indicator Safety System (VMISS) of the present invention is to provide an improvement in the safety of vehicular operations over a wide range of different traffic situations. The preferred VMISS structure is based upon a detailed analysis of vehicular movement patterns, characteristics and hazards of traffic situations, driver response and reactions, and traffic flow conditions which repeatedly occur in conjunction with traffic accidents. The foregoing factors are involved in the great majority of traffic related accidents which result in over 500,000 deaths per year and 2,000,000 disabling injuries annually in the United States and which cause billions of dollars in expenditures for automobile insurance, repairs, and other accident related costs. The VMISS described in this disclosure gains a critical and effective margin of response time through the use of advanced technology and computerized components. The additional response time makes it possible for vehicle operators to take evasive action and to avoid accident and crash situations. The system has the potential for effecting significant reductions in the rates of traffic accidents and for dramatically reducing the deaths, injuries and costs associated with those traffic accidents.

A major advantage of the present VMISS system is that it is completely automatic once the vehicle driver activates the normal signal system. Certain functions are performed with no action on the part of the driver at all. The VMISS system can be easily and inexpensively installed in both new and used cars or in existing vehicles by a qualified auto mechanic. The electronics of the system are suitable for low cost mass production and are compatible with existing vehicle signal systems. Since the system is automatic it is easy for vehicle operators to become familiar with the systems function and operation. Moreover, the VMISS system utilizes commonly understood and widely accepted signal indications thereby making it compatible with state and federal licensing requirements.

FIG. 1A illustrates the traditional situation in which an automobile A (element 20) traveling in the Northbound lane 12 of a two-line highway 10 attempts to make a left hand turn across traffic to a side street 18. Northbound lane 12 is separated from Southbound lane 14 by white center line 16. Cars B and C (elements 22 and 24 respectively) are shown proceeding southward in lane 14. Directional arrows 26 and 28 respectively indicate North and South directions. Automobile A is equipped with conventional signal lights including a left front turn signal light 30, a right front turn signal light 32, a left rear turn signal 34 and a right rear turn signal 36. Frequently the brake lights are integrated with the left and right rear turn signals 34 and 36, however, it is believed that new federal regulations will eventually require that a brake light be placed at the level of the rear window. Lastly, back-up lights 98 are generally provided at the rear of the vehicle (see FIG. 2A).

Car A illustrated in FIG. 1A is equipped with the VMISS system of the present invention. It is stopped in the Northbound lane 12 waiting to turn onto side street 18. Car B is traveling South in direction 38 and temporarily blocks car A from turning onto side street 18. Car C is sufficiently far behind car B as to not present an immediate danger to either car A or car B. Car C is traveling South in the direction of arrow 40. The left front turn signal 30 of car A is blinking at the conventional rate of 80 flashes per minute signalling its intention to cars B and C to make a left hand turn in the near future. The situation thus far described with respect to FIG. 1A is entirely conventional.

FIG. 1B illustrates the functioning of the VMISS system of the present invention. Car B has just passed car A but car C is still approaching though at a distance far enough away as to not make it an immediate danger to car A. Car A now proceeds in the direction of arrow 42 to turn onto side street 18. The left front turn signal 30 of car A now flashes at 200 flashes per second indicating that it has initiated its left hand turn and is committed to complete its maneuver. The higher flash rate clearly tells car C that it had better be prepared to stop in order to avoid possible collision with car A. This eliminates the ambiguity inherent in the situation illustrated in FIG. 1A in which the blinking of the left front turn signal 30 of car A does not distinguish between the intention of car A to make a left hand turn and the actual committment of car A to that maneuver. The clear advantage to the VMISS system is that it gives approaching vehicles, such as car C, an additional amount of time in which to prepare to stop and avoid collision with vehicles turning across traffic. The additional amount of time may be as much as a few seconds and as little as a fraction of a second. Such a system is especially valuable under conditions of poor visibility, such as fog, darkness, snow, in which the light from the turn signal 30 may be seen before the driver of car C can actually observe the gross movements of car A.

FIG. 2A is a schematic illustration of the maximum configuration of the VMISS system of the present invention. It is unlikely that any particular version of the VMISS system would include all of the elements illustrated in FIG. 2A. The purpose of FIG. 2A is to describe the maximum possible configuration of the system.

The VMISS system 50 of FIG. 2A includes several groups of elements. Switch sensor group 102 and engine and speed sensor group 104 provide inputs to the microprocessor group 108. Power interface group 106 acts as a buffer between the input groups 102 and 104 and the microprocessor group 108. Power interface group 106 also acts as a buffer between the microprocessor group 108 and the vehicle signal indicator group 110. Switch sensor group 102 includes a steering wheel position switch 52, a turn indicator switch 54, a back-up switch 56, a brake switch 58 and an accelerator at rest switch 60. The outputs of switches 52, 54, 56, 58 and 60 are fed through a switch buffer 62 which shapes the signals and presents them as inputs to the peripheral interface adaptor circuit 64. The output line 63 from switch buffer 62 is actually five lines condensed into one for illustrative purposes. Therefore, the peripheral interface adaptor 64 receives five inputs corresponding to the outputs of switches 52, 54, 56, 58 or 60. Switch buffer 62 could be an amplifier, or a passive RC network, or some other sort of signal shaper which might act to minimize bounce and to maximize the shape of the signal. Turn indicator switch 54, backup switch 56 and brake switch 58 are all part of the conventional circuitry that exists on an automobile. However, steering wheel position switch 52 and accelerator at rest switch 60 would have to be added. There are several different ways that a steering wheel position switch 52 could be provided for. For example, a set of limit switches could be employed to determine the degree of turn of a steering wheel. Alternatively, existing binary encoding technology could be used to determine the extent of turn, to one side or the other, of the steering wheel. There are numerous other examples of technology that can be employed to determine the turn of a steering wheel or any other rotational device. The accelerator rest switch 60 would preferably comprise a limit switch that indicated that the accelerator was not being depressed.

The engine and vehicle sensor group 104 includes a speedometer cable pick off sensor 74, an engine rpm (ignition primary) sensor 78 and a diesel rpm (mechanical) sensor 82. Sensors 74, 78 and 82 are connected respectively through amplifiers 76, 80 and 84 to peripheral interface adaptor 64. Amplifiers 76, 80 and 84 serve the purpose of amplifying and shaping the signal. Accordingly, amplifiers 76, 80 and 84 could be replaced by passive signal shapers under the right condition. The purpose of the switch sensors in group 102 is to indicate the intention of the vehicle to make a turn. The purpose of the engine and vehicle sensors in group 104 is to indicate the committment of the vehicle to the turn anticipated by the switches in group 102. The other input to the peripheral interface adaptor 64 comes from clock 72 which also acts an an input to the 8 bit microprocessor 68. Therefore, the peripheral interface adaptor may have as many as 8 inputs including the input from clock 72, the inputs from switches 52, 54, 56, 58 and 60, the input from speedometer cable pick-off sensor 74 and the input from either the engine rpm sensor 78 or the diesel engine sensor 82. Sensors 78 and 82 are mutually exclusive. Sensor 78 might be found on a gas engine in which the speed of the engine is determined by sensing the signal from the ignition. Sensor 82 is for use with diesel engines and might typically comprise a mechanical sensor which senses the speed of the engine. Both sensors 78 and 82 would not be found on the same engine at the same time.

The 8 bit microprocessor 68 sends and receives signals from the peripheral interface adaptor via line 66. When it is finished processing a batch of information it may call for more information from the interface adaptor 64 on line 70. Instructions for microprocessor 68 can be stored in the read only memory (ROM) 86. A Random Access Memory (RAM) 88 provides electronic memory for microprocessor 68. The output of the microprocessor group 108 comes from the peripheral interface adaptor 64 and provides an input to relay driver 90. The relay driver 90 acts as an amplifier and/or signal shaper for electromechanical relay 92. Electromechanical relay 92 may be associated with a conventional relay flasher 94 that controls the speed of the flash of the indicator light. Alternatively, relay driver 90 and relays 92 and 94 could be replaced by a solid state relay 96 which performs the same functions. The output from electromechanical relay 92 drives the visual signal indicator group 110 which comprises the front right turn light 32, the front left turn light 30, the rear right turn and brake light 36, the rear left turn and brake light 34 and the rear back-up light 98. The operation of any of the five lights in the vehicle signal indicator group 110 depends upon the input from switch group 102 and vehicle and engine motion group 104 and the program stored in microprocessor 68. Power for the circuit of FIG. 2A comes from a standard dc-dc power converter 100 as illustrated in FIG. 2B. All of the individual circuit elements illustrated in FIGS. 2A and 2B are conventional, off the shelf items familiar to those of ordinary skill in the art.

The minimum configuration of the preferred embodiment 200 of the present invention is illustrated in FIG. 3. It comprises switch 52, switch buffer 62, interface 64, clock 72, microprocessor 68, ROM 86, RAM 88, relay driver 90, relays 92 and the five lights in the vehicle signal indicator group 110. A second input for the minimum configuration of the preferred invention comes from speedometer cable pick-off sensor 74 and amplifier 76. If there is an input from the steering wheel position switch 52 and the speedometer cable pick-off sensor 74, then the microprocessor 68 will tell the appropriate light in the vehicle signal indicator group 110 to turn on. Operation of the minimum configuration of the preferred embodiment 200 as illustrated in FIG. 3 can be understood from the following Example No. 1.

EXAMPLE NO. 1

| Inputs | |
|---|---|
| Sensor | Condition |
| Steering Wheel Position Switch 52 | Left Turn |
| Steering Cable Pick-Off Sensor | Moving, increasing speed |
| Outputs | |
| Signal Indicator | Condition |
| Front, left turn signal 30 | Fast Flash |
| Front, right turn signal 32 | Off |
| Rear, left turn, brake light 34 | Fast flash |
| Rear, right turn, brake light 36 | Off |
| Rear, back-up light 98 | Off |

The circuit 200 of FIG. 3 presumes that the hard turning of the steering wheel as detected by steering wheel position switch 52 is the only information necessary to indicate a committment to a turn. However, it is possible that the circuitry of FIG. 3 might not be discriminating enough to distinguish between a hard accelerating turn and an intention to signal a left or right turn. Accordingly, an improved alternative embodiment is illustrated in FIG. 4 as embodiment 300. The only difference between the circuit 300 of FIG. 4 and the circuit 400 of FIG. 3 is that the circuit 300 of FIG. 4 includes an additional input from the turn indicator switch 54. The advantage of the circuit of FIG. 4 is that it will only operate in the fast flash mode if the driver intentionally places the turn signal indicator switch 54 in either the right or left turn. Therefore it isn't possible to accidentally trigger the fast flash mode if the driver of the automobile A does not intend to signal a left hand turn. The operation of the circuit of FIG. 4 can best be understood by reference to the following example No. 2.

EXAMPLE NO. 2

| Inputs | |
|---|---|
| Sensor | Condition |
| Steering Wheel Position Switch 52 | Left turn |
| Turn Indicator Switch 54 | Left turn |
| Outputs | |
| Signal Indicator | Condition |
| Front, left turn signal 30 | Fast flash |
| Front, right turn signal 32 | Off |
| Rear, left turn, brake light 34 | Fast flash |
| Rear, right turn, brake light 36 | Off |
| Rear, back-up light 98 | Off |

Figure 5:
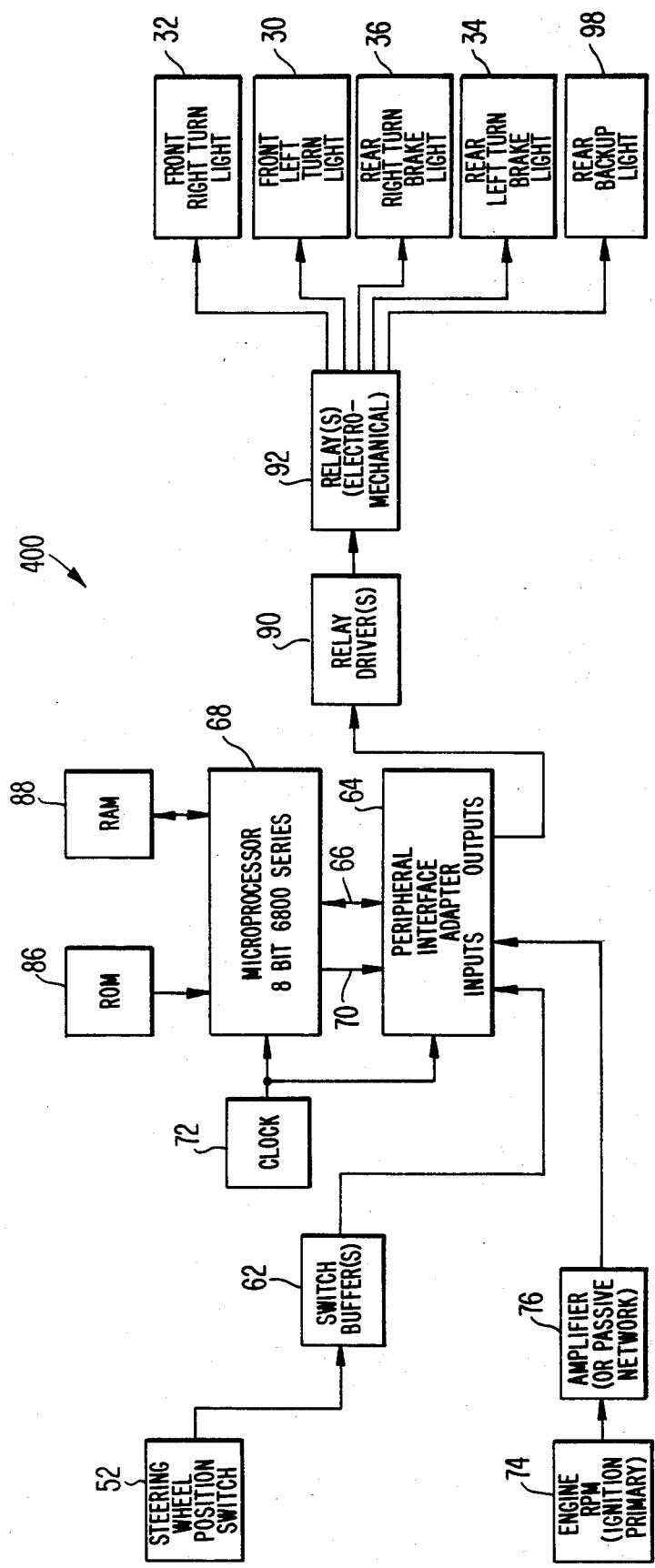
FIG. 5 is a schematic diagram of another alternative embodiment of the invention in which information from an engine rpm sensor is used as an input to the microprocessor.

Another alternative embodiment 400 of the invention is illustrated in FIG. 5. The only difference between the alternative embodiment 400 in FIG. 5 and the preferred embodiment of the invention 200 in FIG. 3 is that the input to the interface adaptor from the speedometer cable pick-off sensor 74 and amplifier 76 has been deleted and replaced by an input from the engine rpm sensor 78 and amplifier 80. The reason is that there are basically two possible methods for determining the acceleration or "jerk" of an automobile engine. One method is to sense the change in speed of the speedometer cable. That is the substance of the preferred embodiment 200 of FIG. 3. Alternatively one can sense the increased electrical activity in the ignition primary of an automobile engine. Increased electrical activity indicates an increased acceleration which is what the engine rpm sensor 78 detects. Therefore the output of the circuit 400 of FIG. 5 is roughly similar to the output of circuit 200 of FIG. 3 as shown in the following Example No. 3.

EXAMPLE NO. 3

| Inputs | |
|---|---|
| Sensor | Condition |
| Steering Wheel Position Switch 52 | Left turn |
| Engine rpm sensor 78 (ignition primary) | moving increasing speed |
| Outputs | |
| Signal Indicator | Condition |
| Front, left turn signal 30 | Fast flash |
| Front, right turn signal 32 | Off |
| Rear, left turn, brake light 34 | Fast flash |
| Rear, right turn, brake light 36 | Off |
| Rear, back-up light 98 | Off |

Figure 6:
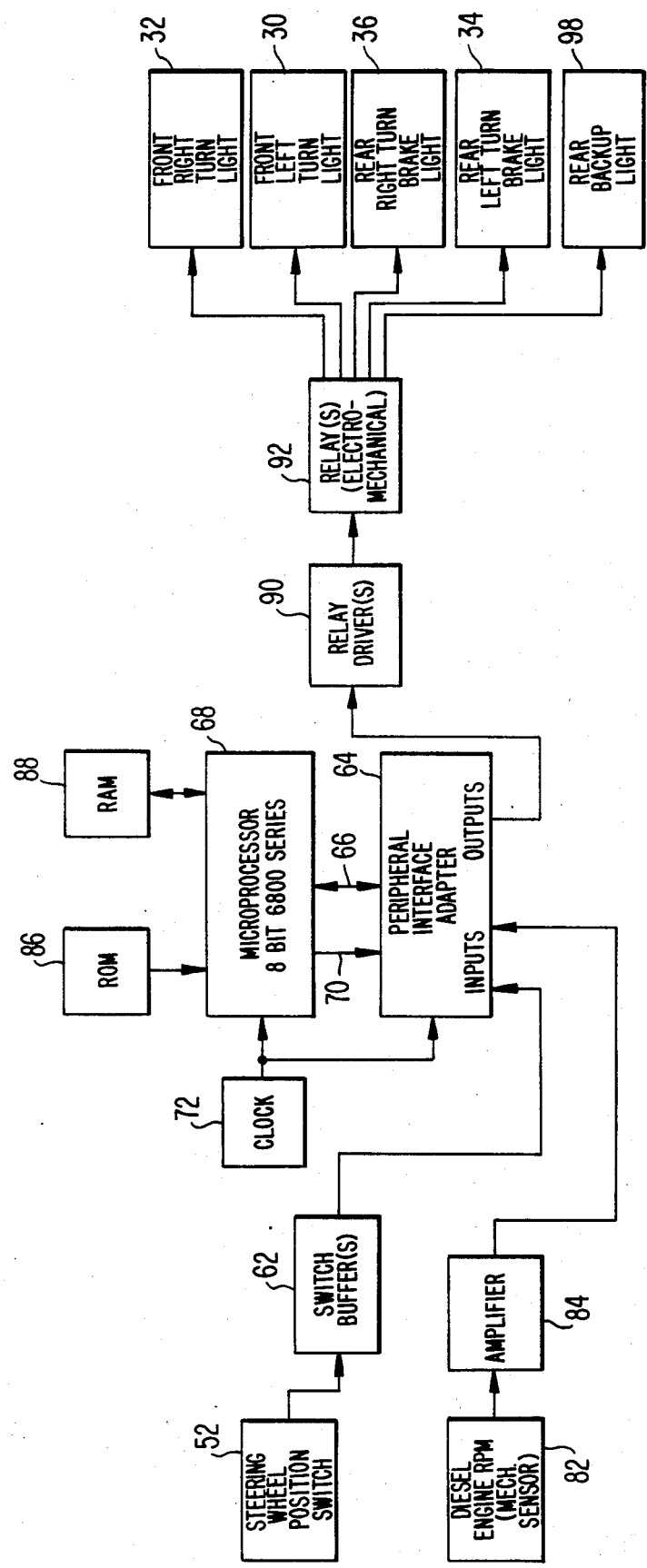
FIG. 6 is a schematic diagram of another alternative embodiment of the invention in which information from a diesel engine rpm sensor is used as an input to the microprocessor.

Another alternative embodiment 500 of the invention is illustrated in FIG. 6. The only significant difference between the preferred embodiment 200 of FIG. 3 and the alternative embodiment 500 of FIG. 6 is that the speedometer cable pick-off sensor 74 and amplifier 76 has been deleted and replaced by a diesel engine rpm sensor 82 and amplifier 84. The alternative embodiment 500 of FIG. 6 is structured as the minimum configuration for the detection of a left hand turn in a diesel powered vehicle. The preferred diesel rpm sensor 82 is a mechanical sensor. It could, for example, take the form of a magnet attached to the fly wheel of the engine and sensed by a conventional diode and amplifier sensor. The operation of the diesel alternative embodiment 500 shown in FIG. 6 can be best understood by referring to the following Example 4.

EXAMPLE NO. 4

| Inputs | |
|---|---|
| Sensor | Condition |
| Steering Wheel Position Switch 52 | Left turn |
| Diesel engine rpm sensor 82 | Moving, increasing speed |
| Outputs | |
| Signal Indicator | Condition |
| Front, left turn signal 30 | Fast flash |
| Front, right turn signal 32 | Off |
| Rear, left turn, brake light 34 | Fast flash |
| Rear, right turn, brake light 36 | Off |
| Rear, back-up light 98 | Off |

The present invention is primarily concerned with vehicles involved in cross traffic movements such as left hand turns across a lane of traffic. This is believed to be the primary area in which the present invention has the most impact on automobile safety. However, there may be conditions in which making a right hand turn might require a fast flash condition too. Such a condition might arise at a complex intersection where more than one lane of traffic might be involved. Accordingly, referring to the preferred embodiment 200 of FIG. 3 the following example illustrates what might happen if the vehicle is signalling a hard right.

EXAMPLE NO. 5

| Inputs | |
|---|---|
| Sensor | Condition |
| Vehicle Wheel Position Switch 52 | Right hand turn |
| Speedometer Cable pick-off Sensor 74 | Moving, increasing speed (i.e. accelerating) |
| Outputs | |
| Signal | Condition |
| Front, right turn light 32 | Fast flash |
| Front, left turn light 30 | Off |
| Rear, right turn and brake light 36 | Fast flash |
| Rear, left turn and brake light 34 | Off |
| Rear, back-up light 98 | Off |

It is also an object of the present invention to signal the status of the braking of the automobile and its inclination to turn left or right from the rear as well as from the front. The previously described embodiments are directed primarily to an indication to oncoming traffic of the intention to turn. The following examples relate to conditions that might be of interest to vehicles approaching both from the front and from the rear. Therefore, all of the following examples are addressed to the maximum system 50 as described in FIG. 2A.

EXAMPLE NO. 6

| Inputs | |
|---|---|
| Sensor | Condition |
| Steering Wheel Position Switch 52 | Any |
| Turn Indicator Switch 54 | Off |
| Back-up Switch 56 | Off |
| Brake Switch 58 | Off |
| Accelerator at Rest Switch | Either |

-continued

| Speedometer Cable Pick-Off Sensor 74 | Stopped |
|---|---|
| Outputs | |
| Signal Indicator | Condition |
| Front, right turn light 32 | Off |
| Front, left turn light 30 | Off |
| Rear, right turn brake light 36 | Off |
| Rear, left turn and brake light 34 | Off |

The foregoing example No. 6 is the limiting condition in which the vehicle is not committed to a turn. Since the speedometer cable pick-up sensor 74 detects that the engine is stopped, obviously the vehicle is not about to move in the immediate future.

Another limiting condition is described in Example No. 7 in which the speedometer cable pick-off sensor 74 indicates that the vehicle is decelerating. Since the vehicle is decelerating it is unlikely that the automobile is about to initiate a turn across traffic.

EXAMPLE NO. 7

| Inputs | |
|---|---|
| Sensor | Condition |
| Steering Wheel Position Switch 52 | Right hand turn |
| Accelerator at Rest Switch 60 | At rest |
| Speedometer Cable Pick Off Sensor 74 | Moving, but decreasing speed (i.e. decelerating) |
| Outputs | |
| Signal Indicator | Condition |
| Front, right turn light 32 | Off |
| Front, left turn light 30 | Off |
| Rear, right turn and brake light 36 | Off |
| Rear, left turn and brake light 34 | Off |
| Rear, back-up light 98 | Off |

In the following Example No. 8 the vehicle is changing from a stopped condition to the moving condition.

EXAMPLE NO. 8

| Inputs | |
|---|---|
| Sensor | Condition |
| Steering Wheel Position Switch 52 | Left hand turn |
| Turn indicator Switch 54 | Any |
| Back-up Switch 56 | Off |
| Brake Switch 58 | Either |
| Accelerator At Rest Switch 60 | Off |
| Speedometer Cable Pick-up Sensor 74 | Transition from stopped to moving (i.e. accelerating) |
| Outputs | |
| Signal Indicator | Condition |
| Front, right turn light 32 | Off |
| Front, left turn light 30 | Fast flash |
| Rear, right turn and brake light 36 | Off |
| Rear, left turn and brake light 34 | Fast flash |
| Rear, back-up light 98 | Off |

Under the following conditions the automobile is presumed to be moving backwards and turning at the same time.

EXAMPLE NO. 9

| Inputs | |
|---|---|

-continued

| Sensor | Condition |
|---|---|
| Steering Wheel Position Switch 52 | Left hand turn |
| Turn indicator Switch 54 | Any |
| Back-up Switch 56 | On |
| Brake Switch 58 | Either |
| Accelerator at Rest Switch 60 | Either |
| Speedometer Cable Pick Off Sensor 74 | Moving, increasing speed (i.e. accelerating) |
| Outputs | |
| Signal Indicator | Condition |
| Rear, left turn and brake light 34 | Fast flash |
| Rear, back-up light 98 | On |

The following examples 10 and 11 are circumstances in which there are not sufficient conditions to cause any of the signal lamps in group 110 to move into the fast flash (i.e. 200 flashes per minute) mode.

EXAMPLE NO. 10

| Inputs | |
|---|---|
| Sensor | Condition |
| Steering Wheel Position Sensor 52 | Left hand turn |
| Indicator Switch 54 | Off |
| Back-Up switch 56 | Off |
| Brake Switch 58 | Off |
| Accelerator at Rest Switch 60 | Either |
| Speedometer Cable Pick-Off Sensor 74 | Stopped or, moving at constant speed (i.e. not accelerating or decelerating) |
| Outputs | |
| Signal Indicator | Condition |
| Front, right turn light 52 | Off |
| Front, left turn light 30 | Off |
| Rear, right turn and brake light 36 | Off |
| Rear, left turn and brake light 34 | Off |
| Rear and Back-up light 98 | Off |

EXAMPLE NO. 11

| Inputs | |
|---|---|
| Sensor | Condition |
| Steering Wheel Position Switch 52 | Center position |
| Turn indicator switch 54 | Left hand turn |
| Back-up Switch 56 | Off |
| Brake Switch 58 | Off |
| Accelerator at Rest Switch 60 | Either |
| Speedometer Cable Pick-Off Sensor 74 or Engine rpm Sensor 78 | Any Any |
| Outputs | |
| Signal Indicator | Condition |
| Front, right turn indicator 32 | Off |
| Front, left turn light 30 | Slow flash |
| Rear, right turn and brake light 36 | Off |
| Rear, left turn and brake light 34 | Slow flash |
| Rear and back-up light 98 | Off |

It may very well be desirable to have both back-up lights 98 blink if the vehicle is moving straight back. Accordingly, the following Example No. 12 illustrates that condition.

EXAMPLE NO. 12

Inputs

| Sensor | Condition |
| --- | --- |
| Steering Wheel Position Switch 52 | Center |
| Turn Indicator Switch 54 | Any |
| Back-up Switch 56 | On |
| Brake Switch 58 | Either |
| Accelerator at Rest Switch 60 | Either |
| Speedometer Cable Pick-Off Sensor 74 | Moving, increasing speed backwards (i.e. accelerating backwards) |

Outputs

| Signal Indicator | Condition |
| --- | --- |
| Front, right turn signal 32 | Off |
| Front, left turn light 30 | Off |
| Rear, right turn brake light 36 | Fast flash |
| Rear, left turn brake light 34 | Fast flash |
| Rear, and back-up light 98 | Fast flash on |

The following is a parts list of the items that comprise the embodiments of FIGS. 2A through 6. All of the items are conventional and known to those of ordinary skill in the art and may be purchased through standard distribution channels.

| Element Description | Model No. |
| --- | --- |
| 8 bit microprocessing unit 68 | Motorola MC6801-68701 |
| Peripheral Interface Adaptor 64 | Motorola MC6801-68701 |
| Random Access Memory 88 | Motorola MC6801-68701 |
| Read Only Memory 86 | Motorola MC6801-68701 |
| Two-Phase Clock Oscillator 72 | Motorola MC6801-68701 |
| Amplifiers 76, 80 and 84 | Standard Op-amp integrated circuits |
| Switch Buffer 68 | Standard integrated circuit as used in C and K components, Inc. SS01 Solid State Switch |
| DC-DC Power Converter 100 | Standard device made up of existing integrated circuit de-regulators |
| Relay Driver 90 | Standard item |
| Solid State Relay 96 | Existing Automotive Product |
| Electromechanical Relays 92 | Existing Automotive Product |
| Flasher Relay 96 | Existing Automotive Product |
| Steering Wheel Position Switch 52 | Can be done in several modes. Preferably either a device in which the steering wheel shaft indicates left of center, center off dead band, or right of center or a device which indicates leftward motion, rightward motion and change from left to right or left as a dead band or a third on condition |
| Turn Indicator Switch 54 | Existing Automotive Product |
| Back-Up Switch 56 | Existing Automotive Product |
| Brake Switch 58 | Existing Automotive Product |
| Accelerator at Rest Switch 60 | Conventional Limit Switch such as made by Honeywell |
| Speedometer Cable Pick Off Sensor 74 | Similar to existing Ford product used in connection with pollution control devices |
| Engine rpm sensor 78 | Standard pulse conditioner for monitoring spark ignition timing |
| Diesel rpm sensor 82 | Believe to exist as standard automotive part |

While the invention has been described with reference to the preferred embodiment thereof it will be appreciated by those of ordinary skill in the art that various changes may be made to the parts, structure and function of the invention without departing from the spirit and scope thereof.

We claim:

1. A turn signal apparatus for use on a motor vehicle comprising:
   turn signal lamp means with a predetermined flash-rate;
   automobile turn indicator switch means;
   front wheel directional sensor means for sensing when at least one of the front wheels of said vehicle is turned;
   vehicle motion commitment sensor means for sensing the commitment of said vehicle to motion;
   vehicle speed detection means for detecting when the speed of said motor vehicle exceeds a predetermined speed;
   brake sensor means for sensing when the brakes of said vehicle are applied;
   microprocessor means connected to said automobile turn indicator switch means, said front wheel directional sensor means, said vehicle motion commitment sensor means, said brake sensor means, and said vehicle speed detection means for determining when said motor vehicle is unambiguously committed to executing a turn; and,
   signal lamp timing means for increasing the flash rate of said predetermined flash rate in response to said microprocessor means.

2. The apparatus of claim 1 wherein said microprocessor means further includes:
   vehicle motion detecting means for detecting the forward and backward movement of a vehicle.

* * * * *